(12) United States Patent
Secondari

(10) Patent No.: US 6,336,515 B1
(45) Date of Patent: Jan. 8, 2002

(54) UNSPRUNG VACUUM-OPERATED TRACTION ENHANCEMENT SYSTEM FOR LAND VEHICLES

(76) Inventor: Francesco Secondari, Apt. 226, 222 S. Kyser Blvd., Madison, AL (US) 35758

( * ) Notice: Subject to any disclaimer, the term of this patent is extended or adjusted under 35 U.S.C. 154(b) by 0 days.

(21) Appl. No.: 09/532,738

(22) Filed: Mar. 22, 2000

(51) Int. Cl.[7] .................. B60B 39/00; B60B 11/10; B60V 1/00; B60T 1/00; B62D 55/00

(52) U.S. Cl. .................. 180/164; 188/2 R; 305/60; 301/1; 301/40.1

(58) Field of Search .............. 188/2 R; 180/164 I, 180/309; 296/180.1, 180.5; 305/60; 301/1, 5.1, 38.1, 40.1

(56) References Cited

U.S. PATENT DOCUMENTS

| | | | | |
|---|---|---|---|---|
| 3,116,897 A | * | 1/1964 | Theed | 180/164 |
| 3,167,154 A | * | 1/1965 | Salvetti | 180/164 |
| 3,209,849 A | * | 10/1965 | Gondert et al. | 180/309 |
| 3,628,625 A | * | 12/1971 | Boyles, Jr. | 180/164 |
| 3,799,293 A | * | 3/1974 | Howells et al. | 188/2 R |
| 3,894,609 A | * | 7/1975 | Wulf | 180/309 |
| 4,044,862 A | * | 8/1977 | Savarimuthu | 188/2 R |
| 4,193,469 A | * | 3/1980 | Graf | 180/164 |
| 4,317,507 A | * | 3/1982 | McMillan | 188/2 R |
| 4,699,252 A | * | 10/1987 | Sing | 305/60 |
| 4,896,749 A | * | 1/1990 | Walker | 188/2 R |
| 4,971,591 A | * | 11/1990 | Raviv et al. | 180/164 |
| 5,194,032 A | * | 3/1993 | Garfinkel | 180/164 |

\* cited by examiner

*Primary Examiner*—S. Joseph Morano
*Assistant Examiner*—Jason R. Bellinger
(74) *Attorney, Agent, or Firm*—Venable; John P. Shannon; Chad C. Anderson

(57) ABSTRACT

A vacuum intake horn is constantly secured to a portion of a land vehicle and connected to a vacuum generator to increase the load on the wheels and, thereby, enhance traction. In order to minimize the clearance between the intake horn face and road surface for greater vacuum force, the vacuum intake horn is attached to a portion of the vehicle such that movement of the vacuum intake horn relative to an associated wheel of the vehicle is no greater than 75% of the movement of the vehicle chassis relative to the wheel. The vacuum intake horn is mounted behind and substantially entirely within the outline of a tire, so that the tire protects the vacuum intake horn from debris and bumps in the road. In one embodiment, the vacuum intake horn is attached to the vehicle by a compensation arrangement that maintains the vacuum intake horn at a generally constant height close to the road surface despite tire deflection or movement of the chassis relative to the associated wheel.

21 Claims, 3 Drawing Sheets

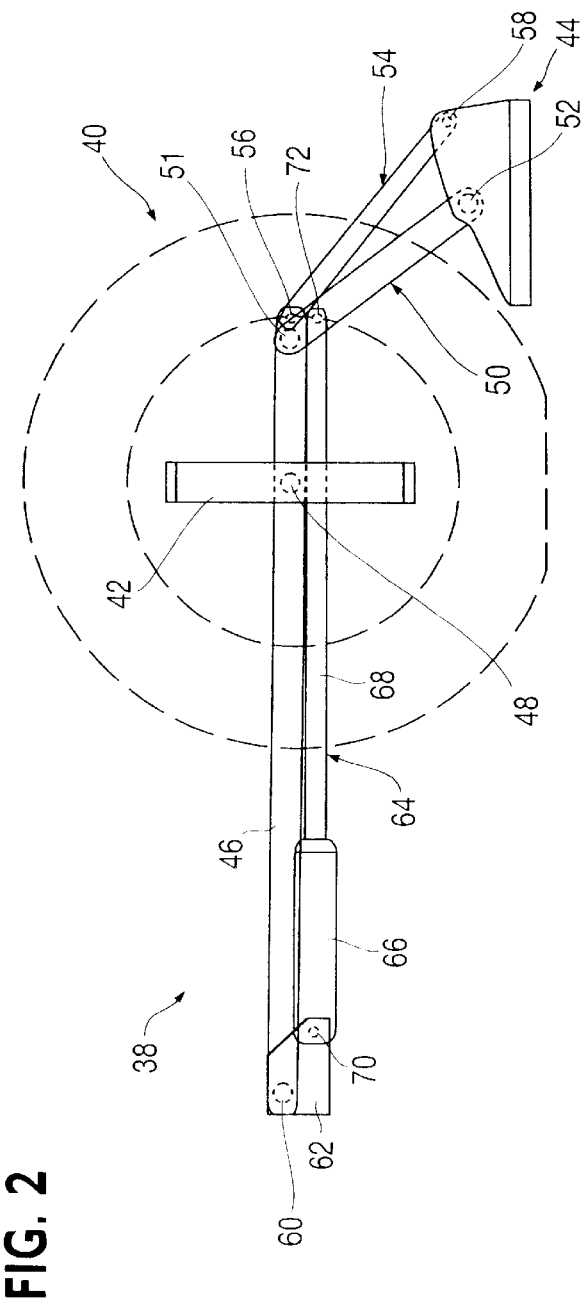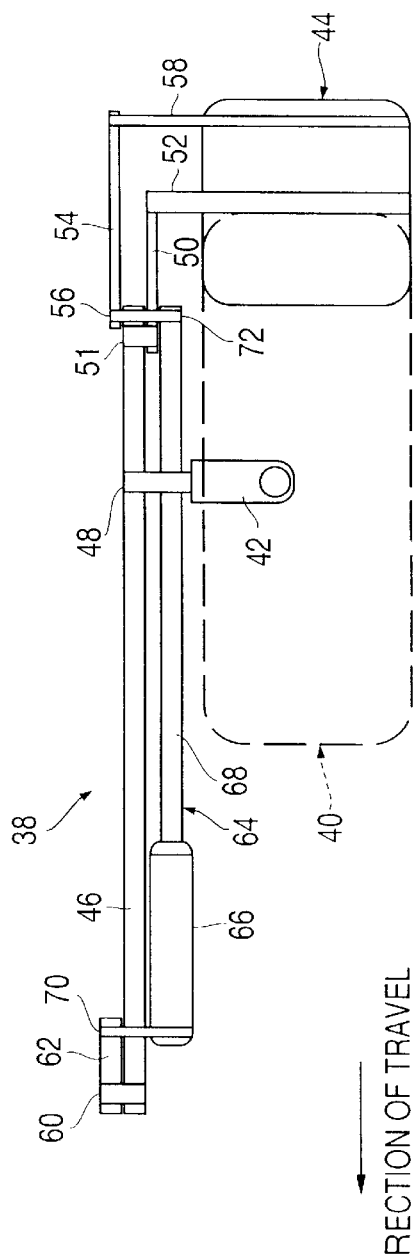

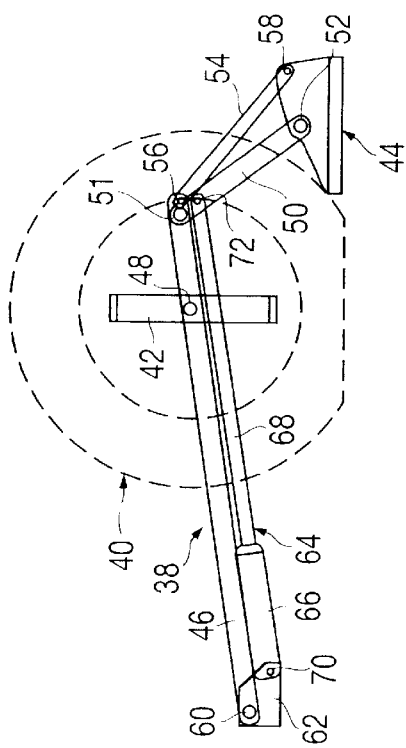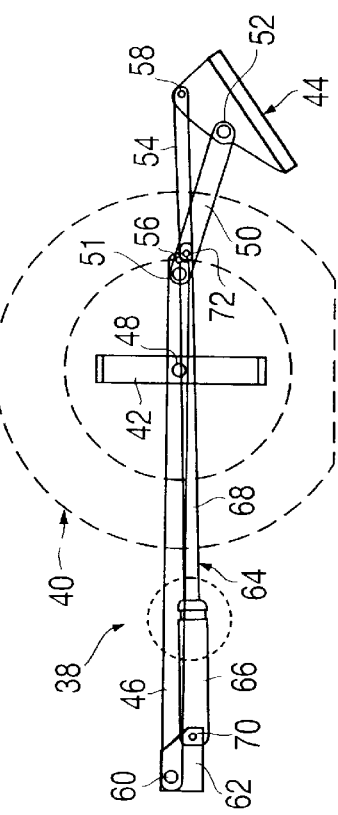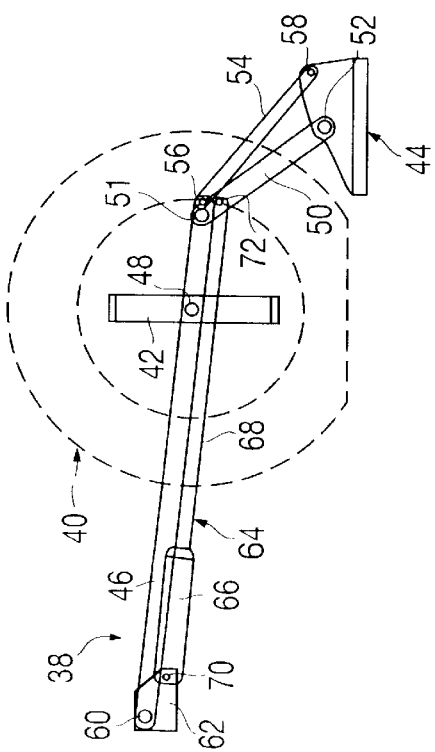

UNSPRUNG VACUUM-OPERATED TRACTION ENHANCEMENT SYSTEM FOR LAND VEHICLES

BACKGROUND OF THE INVENTION

The present invention relates to an apparatus and method for increasing the traction of a wheel supported land vehicle, such as an automobile, especially handling-oriented sports cars.

There are currently several widely known systems of increasing the loading, usually known as downforce, on the wheel assemblies of a vehicle to improve traction without significantly increasing the total vehicle mass. Nearly all fall into one of the following categories: 1) wings oriented to generate downforce attached directly to unsprung suspension components; 2) wings or vacuum generating tunnels attached to a sprung portion of the vehicle, usually the frame or body; and 3) mechanical vacuum generating devices attached to a sprung portion of the vehicle, usually the frame or body. Although any of these can increase the wheel loads by a factor of three or more, they each have significant disadvantages.

Systems of the first category typically require large wings on tall spars to generate significant downforce. This often requires that the wings be in clean air flow to operate effectively and, thus, must be located away from the body of the vehicle. This significantly increases the size of the vehicle. Systems of the first category also tend to obstruct operator vision. They also tend to be fragile and to fail structurally in service.

Systems of the second category can negatively impact the vehicle operation, because the suspension must be designed to accommodate the normal loads of the vehicle as well as the load generated by the downforce devices. Thus, the normal operation of the suspension, which consists of stabilizing and/or isolating the vehicle from linear acceleration loads, lateral acceleration loads and road irregularities, is compromised. In addition, if wings or spoilers are significant downforce generators, then they are usually large enough to obstruct driver vision or significantly increase the size of the vehicle. If tunnels or other aerodynamic arrangements are used to generate a vacuum, and as such are significant downforce generators, then they require significant and precise profiling of the underside of the vehicle, especially with respect to the clearance between the vehicle and the road surface. This causes a double compromise in the suspension design, since the suspension must both accommodate the increased loading and maintain a relatively low and consistent ride height. This usually causes both the aforementioned problem of compromised suspension operation and unacceptably limited ground clearance. Furthermore, profiling takes up significant space within the vehicle and compromises the location of other major components.

Systems of the third category suffer from the aforementioned additional sprung loading and limited ground clearance problems of the second category.

SUMMARY OF THE INVENTION

The traction enhancement system of the present invention increases the traction of a wheel-supported land vehicle by applying areas of vaccuum directed toward the road surface at or near one or more, even all, of the wheel assemblies in order to significantly increase the load on each wheel and thus maximize the traction while not significantly increasing the vehicle mass. The load increase is generated by a vacuum intake horn facing the road surface. The vacuum intake horn for the vacuum is in constant contact and moves proportionally or exactly with a portion of the vehicle that is at least partially unsprung. More specifically, the vacuum intake horn is fixed to the vehicle at the wheel assembly or some point between the wheel assembly and articulation points of the suspension with the vehicle chassis, and hence is at least partially, if not fully, unsprung.

The vacuum intake horn is primarily attached to a portion of the vehicle that is at least partially unsprung and thus primarily loads the unsprung members of the vehicle, especially the wheel assembly, thereby enabling the majority of the vehicle to ride on a suspension that is less compromised than it would be if the vacuum intake horn were attached to a fully sprung portion of the vehicle. Each vacuum intake horn is located near a wheel assembly and the road surface, which permits the system of the present invention to be more firmly attached than unsprung wings used to enhance traction. The vacuum intake horn creates more downforce as a result of being able to be positioned with significantly reduced clearance above the road surface. The clearance of the vacuum intake horn of the present invention is primarily affected by deflection of the wheel assembly, which is comprised almost entirely of deflection in the tire and is usually only a fraction of the deflection in the vehicle suspension. Therefore, the clearance of the vacuum intake horn of the present invention above the road surface can be substantially more consistent than vacuum devices associated with sprung portions of a vehicle. The clearance of such sprung vacuum devices is affected by both the wheel assembly deflection and the suspension deflection. The system of the present invention allows more vacuum and greater downforce per unit area to be generated, and much greater latitude in the location and method of vacuum generation because the downforce is not necessarily created by the specific aerodynamics of the vehicle. The method of providing a vacuum in the vacuum intake horn and the location of the vacuum generating device are not critical to the operation of the system.

The vacuum intake horn is attached to the vehicle at a point such that the vacuum intake horn experiences no more than 75% of the spring deflection experienced by the vehicle chassis, which is fully sprung and experiences all of the spring deflection of the vehicle suspension. In other words, the vacuum intake horn is attached to the vehicle at a point such that movement of the vacuum intake horn relative to its associated wheel assembly is no more than 75% of the movement of the vehicle chassis relative to that wheel assembly. Attachment to the wheel assembly allows the vacuum intake horn to avoid all of the motion of the vehicle chassis relative to the wheel assembly. Other points of attachment that cause the vacuum intake horn to have no more than 75% of the movement of the vehicle chassis relative to the wheel assembly can be determined without undue experimentation.

The term "unsprung" refers to any part of a vehicle whose load is not fully carried by the damping devices of the suspension, unsprung parts being tire/wheel assemblies, hub/spindle assemblies, control arms, stabilizing linkages, brakes, half shafts, springs and shocks. "Fully unsprung" refers to parts whose load is carried solely by the tire/wheel assemblies. Typically, these include hub/spindle assemblies, brakes, tires and wheels. "Partially unsprung" refers to parts whose load is only partially carried by the damping devices of the suspension and which have some portion of their load carried by the tire/wheel assemblies. These are generally components of the suspension itself and half shafts. To be fully sprung, a part's entire load must be carried through the damping devices. Fully sprung parts include parts that are completely supported on a side of the points of attachment of the vehicle chassis or frame to the suspension that is opposite to the side on which the tire/wheel assemblies lie.

The traction enhancement system of the present invention preferably has an arrangement which compensates for deflection in the tires. The compensating arrangement reduces the variation in ground clearance of the vacuum intake horn from, for example, 2.0 inches, if the vacuum intake horn is rigidly attached to the tire/wheel assembly, to 0.6 inches. The system always maintains some ground clearance, but a flexible skirt around the vacuum intake horn face can allow for some interference with the ground. The compensating arrangement can include a mechanism for retracting the vacuum intake horn while the vacuum intake horn is inoperative. In both the operative position and the inoperative position, as much of the intake horn as possible is positioned behind the wheel, with respect to the direction of movement of the vehicle, so that the wheel blocks road debris and the like from striking the intake horn. Preferably, all of the horn is behind and within the lateral outline of the wheel and tire.

The compensating arrangement is attached to the vehicle at a point of attachment primarily through, for example, an attachment yoke connected to an unsprung hub assembly of the vehicle both at the upper and lower suspension attachment points. A secondary attachment point of the compensating arrangement is through a mounting bracket attached to the chassis of the vehicle, which is fully sprung.

The operation of the system is based on the spring rates of the tires and the suspension. The tires and the suspension each have a spring rate which proportionally correlates a given deflection with a particular load. As a load varies at a given wheel position, there is a deflection in the suspension that changes the angle of the control rod and the main beam, each of which is pivotally attached to the support beam. A difference between the length of the main beam and the length of the control rod has the effect that a change in the angle of the main beam and the control rod changes the angle of a support beam. The change in the support beam angle produces a change in the vacuum intake horn face vertical position relative to the hub/spindle assembly that is inverse and nearly equal to the change in hub/spindle assembly position relative to the road surface caused by tire deflection, thus maintaining a more consistent clearance between the face and the road surface. A similar relation between the support beam and the leveling link controls the intake horn face angle. The change in angle of the main beam causes a change in the horizontal distance between the main beam pivot and yoke pivot requiring that an arrangement, such as a soft mount be provided to let the mounting block slightly move horizontally. In the illustrated case, 0.3 inches of tolerance is required.

In the illustrated example, the spring rates are estimated to be 1000 lbf.(pounds force)/in. for each tire and 200 lbf./in for the suspension. These are fairly typical values for normal automobiles. Different spring rates would require adjustments in the position of the pivots, such as by changing the location of the attachment of the control rod to the support beam, moving the location down when the differences are proportionally smaller and up if larger. Changing the leveling rod position on the main beam is one way to adjust the face angle. Varying the lengths of the support beam and leveling rod the preferred way to control the average ground clearance.

Traction enhancement devices, including those according to the present invention, tend to cause drag and increase the power requirements for forward motion when operating and thus reduce the top speed, slow the vehicle, or cause greater fuel consumption. Therefore, the operation of the system of the present invention is often limited to periods when increased traction is necessary, such as stopping or extreme cornering. The system is deactivated during periods when enhanced traction is usually not required such as maximum speed operation, cruising or forward acceleration.

BRIEF DESCRIPTION OF THE DRAWING

FIG. 2 is a schematic front elevation of a second embodiment of the traction enhancement system according to the present invention in which the system is applying no downforce;

FIG. 3 is a top plan view of the traction enhancement system of FIG. 2;

FIG. 4 is a front elevation of the traction enhancement system of FIG. 2 in which the chassis load is increased and the system is applying a downforce;

FIG. 5 is a front elevation of the system of FIG. 2 in which the chassis does not have an increased load and the system is applying a downforce; and FIG. 6 is a front elevation of the system of FIG. 2 in a retracted position.

DETAILED DESCRIPTION OF THE PREFERRED EMBODIMENTS

Figure 1:
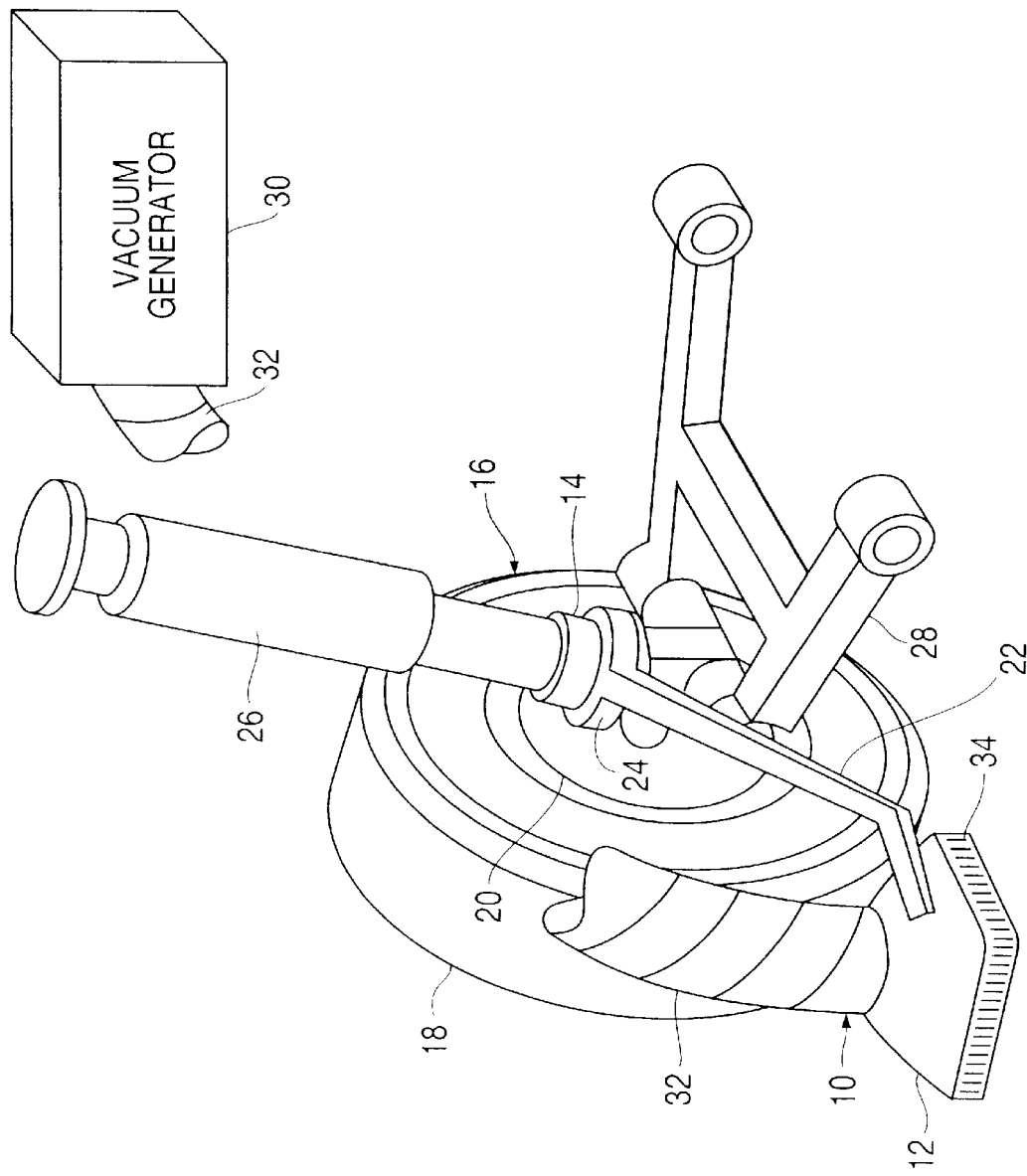
FIG. 1 is a schematic illustration of a first embodiment of the traction enhancement system according to the present invention, in which a vacuum intake horn is mounted on a fully unsprung part of a vehicle.

As can be seen from FIG. 1, the traction enhancement system according to the present invention, which is designated generally by the reference numeral 10, includes a suction head or vacuum intake horn 12 attached to an unsprung portion of a land vehicle. In the illustrated embodiment, the vacuum intake horn 12 is substantially rigidly secured to a lower strut 14 connected to a tire and wheel assembly 16 having a tire 18 and a wheel 20. The connection is made by an elongate rigid member 22 of, for example, aluminum having one end fixed to the vacuum intake horn 12 and an opposite end defining a collar 24 extending around and fixed to the lower strut 14. It can be appreciated that the lower strut 14, the tire 18 and the wheel 20 are unsprung parts of a conventional automobile which also includes a McPherson strut 26 and a lower control arm 28. Of course, other unsprung structures can be used, as long as the vacuum intake horn is attached to an unsprung portion of the vehicle, that is, a portion connected to one of the wheels without the interposition of a shock damping system, for example, a spring arrangement. In addition, the connection can be made by a structure different from the member 22, and the connection need not be a collar.

The traction enhancement system 10 also includes a vacuum generator 30, such as a vacuum pump, which can be mounted in a location on the vehicle remote from the vacuum intake horn 12. The vacuum pump can be mounted in the engine compartment of the vehicle and can be powered by the engine, such as by a drive belt connected to the engine, or it can be powered by a separate motor, in which case it can be mounted in any of many locations. As an alternative, the vacuum generator can be a tunnel in the vehicle or can be another aerodynamic arrangement which produces a vacuum. The vacuum is transmitted from the vacuum generator 30 to the vacuum intake horn 12 by a conduit 32, such as a hose, which has one end connected to an outlet of the vacuum intake horn, the conduit defining a passage from the vacuum generator to the vacuum intake horn. A vacuum of about 3 psi below atmospheric pressure is suitable when applied to a vacuum intake horn having an opening with an area of about 100 square inches facing the road and clearance of less than 1 inch between the vacuum intake horn 12 and the road.

The vacuum intake horn 12 is preferably mounted near one of the wheel assemblies 16 so that there is direct constant connection between the vacuum intake horn and the wheel. With such a direct constant connection, the vacuum intake horn 12 moves up and down with the wheel assembly 16. As a result, the vacuum intake horn 12 rises with the wheel assembly 16 over bumps in the road, rather than striking the bumps. Furthermore, the vacuum intake horn 12 is positioned behind the tire 18 and in alignment with the tire relative to the forward direction of the vehicle. As a result, the tire 18 blocks debris in the road from striking the vacuum intake horn 12. Moreover, debris and bumps that pass under only a narrow portion of the vehicle do not affect the vacuum intake horn 12 even if the vacuum intake horn is in that narrow portion because the vacuum intake horn rises over the debris or bumps with the tire 18. Preferably, the vacuum intake horn 12 is entirely within the width of the tire 18.

Because the vacuum intake horn 12 is directly and constantly mounted on an unsprung portion of the vehicle, its clearance above a road surface is more constant than the corresponding clearance for vacuum-applying devices supported on sprung portions of a vehicle. The clearance of the vacuum intake horn 12 is primarily, and almost solely, affected by deflection in the tire 18. In contrast, the clearance between the road surface and devices mounted on a sprung portion of a vehicle is affected by the tire deflection and by the deflection of the vehicle suspension, which is usually significantly greater than the tire deflection.

The more-constant clearance permits the vacuum intake horn 12 to be positioned more closely to the road surface, which enables a greater vacuum to be applied to the road surface. The vacuum intake horn 12 can be positioned even closer to the road surface, preferably less than 1 inch from the road surface, by providing the vacuum intake horn with an arrangement which can withstand some abrasion from the road. One such arrangement is a skirt 34 of flexible abrasion resistant material, such as rubber, extending downward along the entire perimeter of the intake of the vacuum intake horn 12 and providing a road clearance of less than 1 inch. Another arrangement comprises a system whereby the horn 12 is raised and lowered to compensate for tire deflection, for example, by a pivoting member with a leverage system utilizing the known proportionality between suspension deflection and tire deflection.

Although the structure, including the vacuum intake horn 12, which applies vacuum to the road surface is in direct constant contact with the associated unsprung portion of the vehicle, vacuum is applied to the road surface only a small percentage of the time. Even for race cars, it is estimated that the vacuum will be applied less than 25% of the time of operation. According to the present invention, the vacuum generator 30 is turned on, such as during cornering and braking, and then is turned off to control the applying of the vacuum.

As can be appreciated from FIGS. 2–6, the traction enhancement system according to the present invention can include a compensation arrangement 38 for compensating for the deflection of the sprung portion of the vehicle as well as for the deflection of the tires, so that the vacuum intake horn is, in its operative position, always at an appropriate height above the road surface for creating a sufficient vacuum to provide an effective downforce at a wheel. The compensation arrangement 38 is secured to a wheel assembly 40 by, for example, an attachment yoke 42, an upper portion of which can be fixed to an outboard pivot of a conventional upper control arm, and a lower portion of which can be fixed to an outboard pivot of a conventional lower control arm. A vacuum intake horn 44 is connected to the wheel assembly 40 by a main beam 46 which is oriented generally horizontally, extending in the front-back direction of the vehicle, and is pivotally mounted on a rod 48 extending laterally inward from the attachment yoke 42. The yoke 42 attaches the main beam 46 via the rod 48 to control arms and/or struts. The vacuum intake horn 44 is connected to a point just forward of the rear end of the main beam 46 by a support beam 50, which is connected by a pivotal connection 51 at one end to the main beam 46 and pivotally connected at an opposite end to the vacuum intake horn 44 by a pivotal connection 52. A levelling link 54 defines another connection between the vacuum intake horn 44 and the main beam 46, the levelling link 54 being pivotally connected at one end by a pivotal connection 56 to a point on the main beam 50 slightly rearward of the support beam connection 51 to the main beam 46 and being pivotally connected at an opposite end by a pivotal connection 58 to a point on the intake horn 44 spaced rearward from the pivotal connection 52 between the support beam 50 and the vacuum intake horn 44.

The main beam 46 is pivotally connected near its forward end by a pivotal connection 60 to a mounting block 62, which is in turn secured to the vehicle chassis. A control rod 64 includes a fluid pressure cylinder 66 from which an elongate member 68 projects rearward, rearward extension of the elongate member being controlled by fluid pressure in the fluid pressure cylinder. An end of the fluid pressure cylinder 66 remote from the elongate member 68 is pivotally connected by a pivotal connection 70 to the mounting block 62 slightly rearward from and below the main beam pivotal connection 60, and an end of the elongate member 68 remote from the fluid pressure cylinder 66 is pivotally connected to the support beam 50 at a pivotal connection 72 slightly below and rearward from the support beam pivotal connection 51 on the main beam 46. The mounting block 62 attaches the main beam 46 and the control rod 64, via their respective pivotal connections 60 and 70, to the chassis.

The fluid pressure cylinder 66 is powered by a hydraulic pump or air compressor and controlled by the vehicle driver through a control mounted in the vehicle passenger compartment. Such fluid pressure controls in connection with vehicle-mounted devices are well known. Through the operation of the control, the driver can move the deflection compensation arrangement between an operative condition, as is shown in FIGS. 2–5, and an inoperative condition, as is shown in FIG. 6. Rather than being driver-actuated, the fluid pressure cylinder control system can be actuated automatically through the use of sensors for sensing such conditions as acceleration, cornering and braking.

In the position of the deflection compensation arrangement of the present invention shown in FIG. 2, the arrangement is shown in a level ride condition in which a typical chassis load is exerted at the wheel for a condition in which there is no braking, cornering or acceleration of the vehicle and in which no downforce is exerted at the wheel by the vacuum-operated traction enhancement system. In FIG. 4, the deflection compensation system is shown for an outside wheel during maximum cornering or a front wheel during maximum braking in which the chassis load at the wheel is approximately doubled from that of FIG. 2 and the traction enhancement system according to the present invention exerts a downforce at the wheel which is approximately one-third of the downforce of the chassis load at the wheel. For example, for a vehicle in which the chassis load at the wheel is 750 pounds of force in FIG. 2, the chassis load is 1500 pounds of force in FIG. 4, and the downforce exerted by the traction enhancement system is 500 pounds of force. Furthermore, without any change in the condition of the fluid pressure cylinder 66, the clearance between the vacuum intake horn 44 and the road is made smaller in FIG. 4 than in FIG. 2 but some clearance is maintained in FIG. 4 even though the tire is at virtually maximum operational deflection in this case. This is due to the downward movement of the vehicle chassis at the mounting block 62, which inclines the main beam 46 and the control rod 64 downward at the front. The mounting block 62 maintains its horizontal orientation, while the main beam 46 and the control rod 64 become inclined. This moves the pivotal connection 72 of the control rod 64 slightly forward relative to the pivotal connection 56 of the main beam 46, and this forward movement causes a forward movement at the pivotal connection 72 between the control rod 64 and the support beam 50, and a forward and downward movement of the vacuum intake horn 44. The levelling link 54 maintains the vacuum intake horn 44 in a substantially horizontal orientation. The vacuum intake horn 44 is moved forward and downward even though the rearward ends of the main beam 46 and the control rod 64 and their pivotal connections 51, 56 and 72 to the support beam 50 and the levelling link 54 are raised.

In FIG. 5, the deflection compensation arrangement is shown for an inside wheel during maximum cornering of the vehicle or a rear wheel during maximum braking. In the illustrated condition, the chassis exerts no load at the subject wheel, whereas the vacuum-operated traction enhancement system exerts 500 pounds of force downward. As can be seen in FIG. 5, the forward ends of the main beam 46 and the control rod 64 are raised above the rod 48 at which the attachment yoke 42 is connected to the wheel assembly 40, while the rearward end of the main beam 46 and the control rod 64 are lowered below the rod 48. In this condition, the control rod 64 exerts a rearward movement on the support beam 50, which causes the support beam to pivot rearward and upward relative to its position in FIG. 2. However, overall, the lowering of the rearward end of the main beam 46 and control rod 64 causes the vacuum intake horn 44 to be closer to the road surface in the condition of FIG. 5 than in the condition of FIG. 2, maintaining a minimal clearance even though the tire is virtually undeflected in this case.

The reason that the clearance of the vacuum intake horn 44 above the road surface is reduced when the main beam 46 is either lowered or raised is that the change in angle of the main beam 46 is essentially linear with respect to suspension deflection, but the change in angle of the support beam 54 is slightly more sinusoidal relative to suspension deflection. Overall minimum clearance is best achieved when the peak of the sinusoidal curve occurs at the midpoint of suspension deflection. Hence, clearance decreases as the suspension moves away from the midpoint of its deflection.

In FIG. 6, the traction enhancement system is shown in a retracted position in which it does not exert any downforce at the wheel. Movement of the vacuum intake horn 44 to the retracted position of FIG. 6 from, for example, the position of FIG. 2, is caused by rearward extension of the elongate member 68 of the control rod 64 from the fluid pressure cylinder 66. This causes the support beam 50 to pivot rearward and upward, with the vacuum intake horn 44 moving rearward and upward with the support beam 50.

It will be apparent to those skilled in the art and it is contemplated that variations and/or changes in the embodiments illustrated and described herein may be made without departure from the present invention. For example, although a vacuum intake horn has been described in association with one of the wheels, additional similar vacuum intake horns can be provided at other wheels, even all of the other wheels. As another example, one vacuum intake horn can be arranged to provide a downward force at more than one wheel. Accordingly, it is intended that the foregoing description is illustrative only, not limiting, and that the true spirit and scope of the present invention will be determined by the appended claims.

What is claimed is:

1. A land vehicle having at least two wheels, an unsprung portion connected to the wheels without the interposition of a shock damping system and a sprung portion connected to the wheels through a shock damping system connected to the wheels, the sprung portion comprising a chassis connected to the shock damping system on a side of the spring arrangement opposite to the wheels, the shock damping system enabling movement of the chassis relative to the wheels, and a traction enhancement system, wherein the traction enhancement system comprises means for generating a vacuum; and means for applying the vacuum generated by the generating means to a surface on which the land vehicle travels, wherein said vacuum applying means comprises a structure associated with at least one of the wheels, said structure bearing at least partially on the unsprung portion of the land vehicle to bias the associated wheel into enhanced traction engagement with the surface on which the land vehicle travels, said structure being in constant contact with the unsprung portion, and said structure being attached to the vehicle at a point such that movement of said structure relative to said associated wheel is no greater than 75% of the movement of said chassis relative to said associated wheel.

2. The land vehicle of claim 1, wherein load bearing members of said structure are fixed solely to the unsprung portion.

3. The land vehicle of claim 1, wherein said vacuum applying means comprises a plurality of said structures, each said structure being positioned adjacent to a respective one of said wheels.

4. The land vehicle of claim 1, wherein said structure is immobile relative to the unsprung portion.

5. The land vehicle of claim 1, wherein said means for generating a vacuum is positioned remote from said means for applying the vacuum, the traction enhancement system further comprising a vacuum conduit extending from said means for generating to said means for applying.

6. The land vehicle of claim 1, wherein the structure comprises a suction head having a flexible, abrasion-resistant skirt extending toward the surface on which the land vehicle travels.

7. The land vehicle of claim 1, wherein a tire having a width is mounted on said wheel, and said structure has a vacuum intake head mounted behind said tire with respect to the direction of travel of the land vehicle.

8. The land vehicle of claim 1, wherein the land vehicle travels on a surface, and the vacuum intake head is movable between an operating position, in which the vacuum intake head is sufficiently close to said surface to create an effective vacuum with the surface, and a retracted position, whereby the potential of damage to said vacuum intake head is reduced.

9. A land vehicle having at least two wheels, an unsprung portion connected to the wheels without the interposition of a shock damping system, and a sprung portion connected to the wheels through a shock damping system connected to the wheels, the sprung portion comprising a chassis connected to the shock damping system on a side of the spring arrangement opposite to the wheels, the shock damping system enabling movement of the chassis relative to the wheels, and a traction enhancement system, wherein the traction enhancement system comprises
 a vacuum generator;
 a vacuum intake head associated with at least one of the wheels, said vacuum intake head having a constant bearing on the unsprung portion; and
 a vacuum passage extending from said vacuum generator to said vacuum intake head;
 wherein a vacuum from the vacuum generator is communicated to the vacuum intake head, and the vacuum intake head is attached to a portion of the vehicle at a point such that movement of the vacuum intake head relative to the associated wheel is no greater than 75% of the movement of the chassis relative to the wheel.

10. The land vehicle of claim 9, wherein the system has a plurality of vacuum intake heads, each said vacuum intake head being positioned adjacent to a respective one of said wheels.

11. The land vehicle of claim 9, wherein said vacuum intake head is immobile relative to the unsprung portion.

12. The land vehicle of claim 9, wherein said vacuum generator is positioned remote from said vacuum intake head, and said vacuum passage comprises a vacuum conduit extending from said vacuum generator to said vacuum intake head.

13. The land vehicle of claim 9, wherein said vacuum intake head has a flexible, abrasion-resistant skirt extending toward the surface on which the land vehicle travels.

14. The land vehicle of claim 9, wherein a tire having a width is mount on said wheel, and said vacuum intake head is mounted behind said tire with respect to the direction of travel of the land vehicle.

15. The land vehicle of claim 9, wherein the land vehicle travels on a surface, and the vacuum intake head is movable between an operating position, in which the vacuum intake head is sufficiently close to said surface to create an effective vacuum with the surface, and a retracted position, whereby the potential of damage to said vacuum intake head is reduced.

16. The land vehicle of claim 9, wherein the land vehicle travels on a surface, and the vacuum intake head is attached to a portion of the land vehicle by compensation means for maintaining the vacuum intake head sufficiently close to said surface to create an effective vacuum with said surface during movement of the chassis relative to the wheels.

17. The land vehicle of claim 16, wherein said compensation means comprises:
 a securement member adapted to be secured to a portion of the land vehicle that is at least partially unsprung;
 a mounting member adapted to be secured to a portion of the land vehicle that is fully sprung;
 a beam member connecting said securement member to said mounting member;
 a linkage connecting the vacuum intake head to said beam member; and
 a power driver connected to the vacuum intake head to move the vacuum intake head relative to said beam member.

18. The land vehicle of claim 9, wherein the land vehicle travels on a surface, and the vacuum intake head is attached to a portion of the vehicle by a compensation arrangement that maintains the vacuum intake head sufficiently close to said surface to create an effective vacuum with said surface during movement of the chassis relative to the wheels.

19. The land vehicle of claim 18, wherein the compensation arrangement comprises:
 a securement member adapted to be secured to a portion of the land vehicle that is at least partially unsprung;
 a mounting member adapted to be secured to a portion of the land vehicle that is fully spring;
 a beam member connecting said securement member to said mounting member;
 a linkage connecting the vacuum intake head to said beam member; and
 a power driver connected to the vacuum head to move the vacuum head relative to said beam member.

20. The land vehicle of claim 8, wherein, in the retracted position, the vacuum intake head is at a distance from the surface such that the vacuum intake head does not create an effective vacuum with said surface.

21. The land vehicle of claim 15, wherein, in the retracted position, the vacuum intake head is at a distance from the surface such that the vacuum intake head does not create an effective vacuum with said surface.

* * * * *